United States Patent [19]

Friedes et al.

[11] Patent Number: 5,521,966
[45] Date of Patent: May 28, 1996

[54] METHOD AND SYSTEM FOR MEDIATING TRANSACTIONS THAT USE PORTABLE SMART CARDS

[75] Inventors: Albert Friedes, East Brunswick, N.J.; Carlos A. Perea, Bethlehem, Pa.; Yao-Chung Tsao, Middletown, N.J.

[73] Assignee: AT&T Corp., Murray Hill, N.J.

[21] Appl. No.: 167,596

[22] Filed: Dec. 14, 1993

[51] Int. Cl.⁶ .................................................. H04M 11/00
[52] U.S. Cl. .................. 379/91; 379/90; 379/95
[58] Field of Search ................. 379/90, 91, 96, 379/97, 98, 357, 93, 95; 364/401, 408; 235/379, 380, 381, 382, 382.5; 380/24, 25; 340/825.33

[56] References Cited

U.S. PATENT DOCUMENTS

| | | | |
|---|---|---|---|
| 4,634,848 | 1/1987 | Shinohara et al. | 235/379 |
| 4,654,482 | 3/1987 | DeAngelis | 379/91 |
| 4,795,898 | 1/1989 | Bernstein et al. | 235/380 |
| 4,816,653 | 3/1989 | Anderl et al. | 235/380 |
| 4,851,650 | 7/1989 | Kitade | 235/379 |
| 4,882,474 | 11/1989 | Anderl et al. | 235/380 |
| 5,163,086 | 11/1992 | Ahearn et al. | 379/91 |
| 5,175,416 | 12/1992 | Mansudt et al. | 235/379 |
| 5,218,633 | 6/1993 | Clagett et al. | 379/96 |
| 5,329,589 | 7/1994 | Fraser et al. | 379/91 |

OTHER PUBLICATIONS

The article "Smart credit cards: the answer to cashless shopping" IEEE spectrum, Feb. 1984, pp. 43–49.

*Primary Examiner*—Jason Chan

[57] ABSTRACT

The invention provides a method and system for employing a communication system to mediate a transaction involving one of a plurality of files and programs corresponding to a plurality of applications residing on a single smart card. The invention uses a smart card gateway which provides a transparency in the communication between a caller station and a subscriber station and subscriber host associated with one of the applications. The smart card gateway facilitates transactions involving smart cards, and permits completed transactions to be recorded on the smart card as well as stored in a database associated with the smart card gateway.

46 Claims, 3 Drawing Sheets

METHOD AND SYSTEM FOR MEDIATING TRANSACTIONS THAT USE PORTABLE SMART CARDS

BACKGROUND OF THE INVENTION

1. Field of the Invention

The present invention generally relates to the use of a communication system to mediate transactions among entities reachable by the communication system. More particularly, the present invention relates to mediating a transaction that uses a portable smart card and that employs a telecommunication network service.

2. Description of Prior Art

The use of personal smart cards for identification purposes, purchases, reservations and other transactions has become increasingly popular. Such cards may contain information such as an account or identification number and the name of the account owner, as well as other personal and application specific information. This information may be stored on a magnetic stripe on the back of the card or in a computer memory in the smart card.

Such smart cards, or portable data carriers, are known in the art U.S. Pat. No. 4,795,898, "Personal Memory Card Having a Contactless Interface Using Differential Data Transfer," for example, discloses a personal memory card which includes a microcomputer, an electrically erasable field programmable read-only memory, and also circuitry for inductively receiving a power signal and capacitively transferring data signals between the card and a card reader/writer located in an associated station. No direct ohmic contact is made between the card and the reader/writer for transferring power to the card or for transferring data to and from the card. The disclosed smart card is selectively reprogrammable by an authorized user with new and different data. The information stored in this manner is machine-readable, thereby permitting transactions to be performed more quickly and efficiently. This patent and all other patents or applications referred to herein are incorporated by reference.

It is also known in the art to provide improved security for multiple files which support multiple applications that may be stored on a smart card. U.S. Pat. No. 4,816,653 and U.S. Pat. No. 4,882,474 disclose a method and system for controlling access to files on a card and for limiting the exercise of card commands by an application which accesses specific data in a file on the card. A method and apparatus for specifying different security levels for permission to read, write or append data on or to the card are also disclosed. Multiple applications, therefore, may exist on a smart card without conflict or confusion.

Also known in the art is the use of a communication system to mediate transactions among entities reachable by the communication system. U.S. Pat. No. 5,329,589, issued on Jul. 12, 1994, discloses one such method.

SUMMARY OF THE INVENTION

The present invention provides a method and system for employing a communication system to mediate a transaction involving one of a plurality of files and programs corresponding to a plurality of applications where said plurality of files and programs reside on a single smart card associated with one of a plurality of smart card distributors, said method comprising the steps of receiving in said communication system a signal from a caller station, said caller station including means for placing a telecommunication call, means for reading information from and writing information to said smart card, and means for receiving and sending data, where said signal occurs as a result of a smart card user having dialed a telecommunication number on said means for placing a telecommunication call, where said telecommunication number corresponds to said smart card distributor; and responding to said signal by performing steps in the communication system including identifying said smart card distributor; obtaining a first set of data from said smart card; identifying an application selected by said smart card user from said plurality of applications; establishing at least one data path to a subscriber host associated with said application; sending a second set of data to said subscriber host via said data path where said second set of data pertains to said application; receiving a third set of data from said subscriber host via said data path; and sending said third set of data to said caller station.

As one feature of the present invention, management of multiple applications residing on a single smart card is facilitated.

As another feature of the present invention, transactions between a card-holder and multiple subscriber hosts are mediated.

As yet another feature of the present invention, a transparency in the communication between the subscriber hosts and a smart card caller station eliminates the need to change the hosts to handle the various types of card reader/writers and caller devices.

As a further feature of the present invention, communication with a file or program pertaining to a particular application is facilitated through the use of any one of multiple types of caller devices.

As yet a further feature of the present invention, completion and recording of a transaction are automated.

As an additional feature of the present invention, front end processing of data on a smart card may be performed for a particular application.

As yet an additional feature of the present invention, administration of personal data residing on a smart card is facilitated.

As yet another feature of the present invention, a common point is provided for storage of information recorded on a smart card or stored in a subscriber's host database.

The above-discussed features, as well as additional features and advantages of the present invention, will become more readily apparent by reference to the following detailed description and accompanying drawings.

DETAILED DESCRIPTION

The present invention provides a method and system for employing a communication system to mediate a transaction involving one of a plurality of applications residing on a single portable smart card. The method and system are designed for use in transactions taking place through an in-bound telecommunication service employing a service access code (SAC), such as the AT&T 800 service. Although the following description is primarily discussed in the context of utilization of the invention in conjunction with the AT&T 800 service, it should be understood that the techniques are applicable more generally to other service access codes (SACs).

Figure 1:
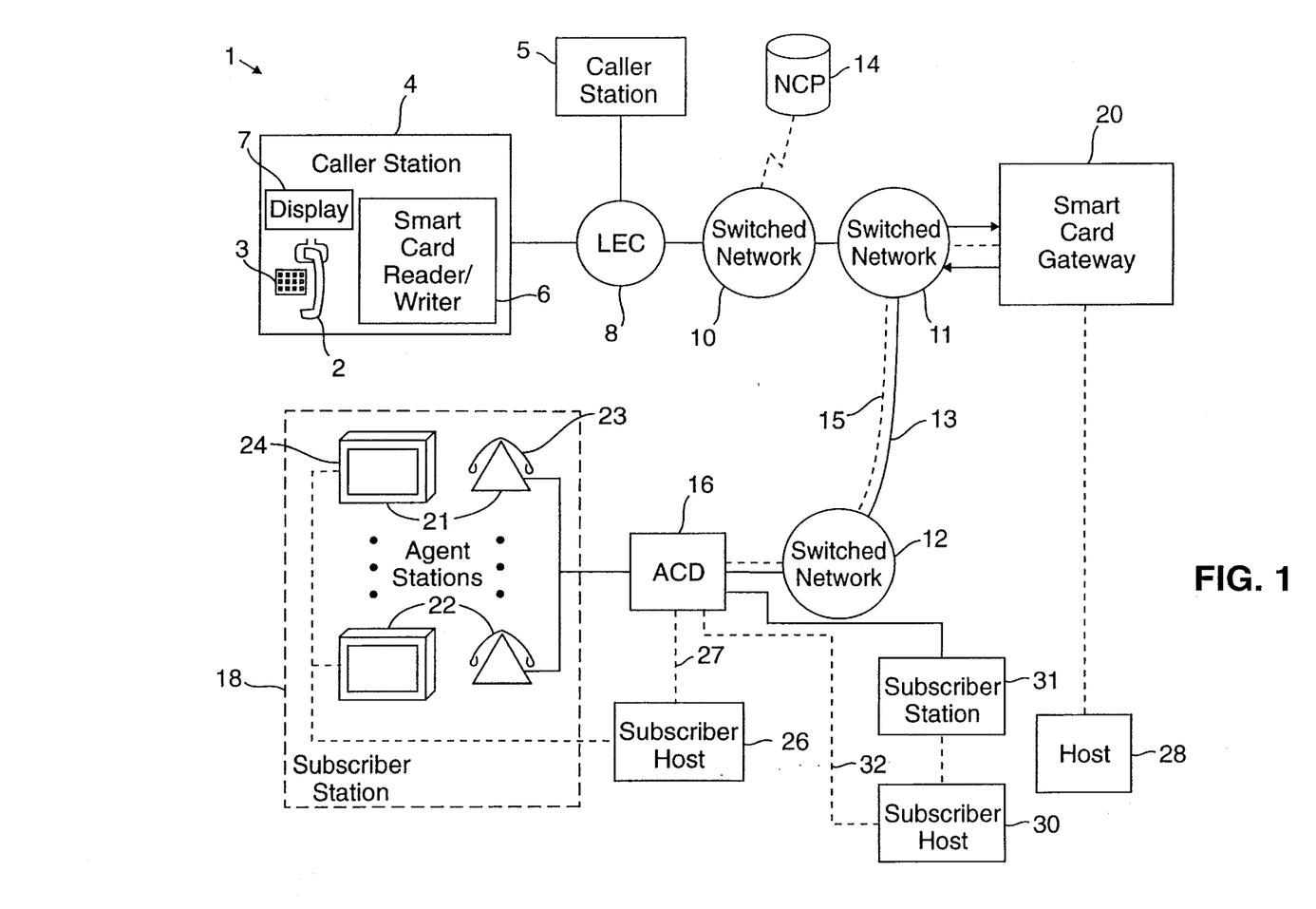
FIG. 1 is a block diagram of an exemplary system incorporating a smart card gateway according to the present invention.
Figure 2:
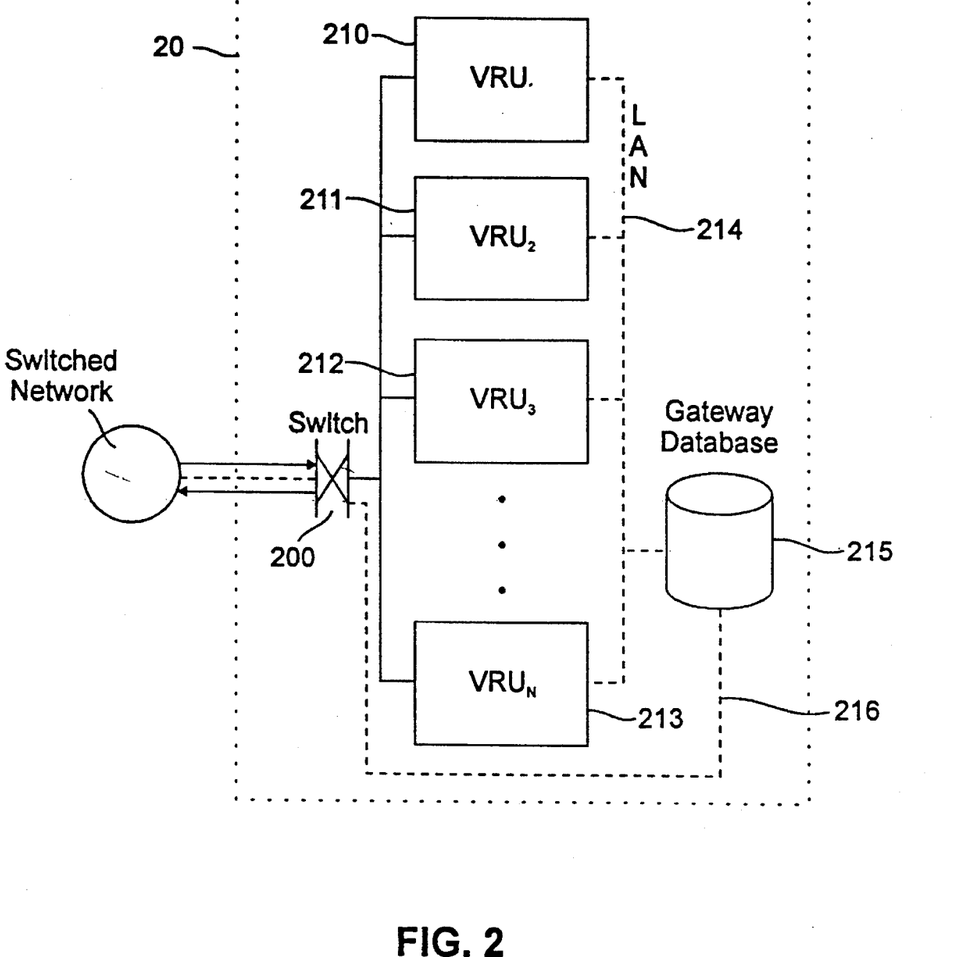
FIG. 2 is a schematic diagram showing an exemplary smart card gateway according to the present invention.

The following generic call flow can be best understood with reference to FIG. 1, which is a block diagram of an exemplary system 1 incorporating the method of the present invention, and FIG. 2, which shows an exemplary smart card gateway 20 according to the present invention in greater detail.

A smart card user dials an 800 number from a calling device such as a telephone handset 2 and keypad 3 at a caller station 4. The system 1 may include a second caller station 5 which may be used in he some manner as the caller station 4. While the calling device in FIG. 1 is shown as a telephone handset 2 and keypad 3, other suitable calling devices include personal computers and separate voice/data equipment such as AT&T Public Phone 2000 devices. According to the present invention, an 800 number is uniquely associated with a particular smart card distributor, which distributes the smart cards and performs initial programming of the smart cards for smart card users. A smart card distributor can serve as a host for multiple associate smart card subscribers. Based upon the 800 number dialed, the call is routed to the smart card gateway 20 by known 800 call routing techniques, such as through a local exchange company or companies (LECs) 8 and a switched network or networks 10, 11, and by associated network control points (NCPs) associated with those networks, such as NCP 14 associated with the network 10 in FIG. 1. The dialed digits are passed to the smart card gateway 20 via Dialed Number Identification Service (DNIS) to identify the dialed 800 number. By accessing a gateway database 215, shown in FIG. 2, that includes a distributor file, the gateway 20 identifies the smart card distributor. Next, the smart card gateway 20 detects the caller's calling device type. Such detection is performed, for example, by having the caller identify his calling device type by speaking the device type name in response to a prompt, by selecting the device type on a screen, or by entering a numerical code on a touch-tone telephone in response to a prompt. The gateway 20 then determines the appropriate caller interface accordingly. For example, voice can be used for a caller using a telephone. The caller is then connected to the smart card gateway 20, where a switch 200 determines which of a plurality of voice response units (VRUs) 210, 211, 212, and 213 is available. Although four VRUs 210, 211, 212, and 213 are shown in FIG. 2, there may be a lesser or greater number of VRUs as required. The call is then routed to one of the available VRUs, 210, 211, 212, or 213, for example, VRU 210.

Corresponding to each smart card distributor served by the smart card gateway 20, there is a script either residing in the gateway database 215 which is connected via a local access network (LAN) 214 to the VRU 210 or accessible by the gateway database 215 via data transfer from a distributor database or other network component. The caller now interacts with the script. The caller, for example, may hear distributor-specific prompts from the VRU 210 instructing the caller to insert a smart card into a smart card reader/writer 6 associated with the caller station 4. A first set of data on the smart card that specifies the caller's profile, such as the card number and the user's name, is read by the card reader/writer 6, transmitted through the LEC 8 and the switched networks 10, 11 to the smart card gateway 20, where this information is used to access the caller's record in the gateway database 215 identified with the particular distributor. The first set of data may include other personal information as well. Security provisions of the smart card can prevent one distributor from gaining access to data and information stored on another distributor's smart card or application. It also should be noted that in an alternative arrangement, the smart card user would insert his smart card into the reader/writer 6, and the gateway 20 would automatically read the smart card. This arrangement would not require any prompts to be provided in order for the smart card to be read.

The VRU 210 then may prompt the caller for information to validate the caller for security purposes. Although personal identification number validation can be performed by equipment at the caller premises, the use of other validation methods can effectively be done via centralized intelligence. The smart card gateway 20 can readily be adapted to provide such centralized intelligence call processing. The validation is performed, for example, by prompting the caller to enter a password on a touch tone keypad, by prompting the caller for a voice or thumb imprint, or by taking a video image of the caller from a video phone. A valid password, voice imprint, thumb print or caller image is encrypted into a file on the smart card or stored in the gateway database 215. The gateway 20 then compares the information obtained from the caller with this stored information and verifies the caller as a legitimate smart card user based upon the comparison. If the validation fails more than a predetermined number of times, the VRU 210 can then instruct the card reader/writer 6 to return the smart card to the caller. Alternatively, the validation step may be performed after the caller has selected an application, so that the validation may be application specific as well as caller specific.

The VRU 210 prompts the caller to identify the subscriber or application that the caller wishes to contact. Depending upon the hardware available to the caller and the software in the network, the caller may hear, for example with the handset 2, or see, for example on a display 7, a list or display of available applications on the smart card. The caller may then identify an application by speaking the application's name or numerical code, by entering a numerical code on a touch-tone telephone, by using the key pad 3, or by entering appropriate input on a personal computer or other electronic device such as a keyboard or light pen. The gateway 20 may then confirm the selection made.

The VRU 210 then automatically dials and establishes, via switched networks 11, 12, a voice path 13 to an automatic call distributor (ACD) 16 connected to a subscriber station 18 suitable to the selected application. The subscriber station 18 may consist of multiple agent stations 21, 22, where each agent station 21, 22 may consist of a telephone 23 connected to the ACD 16 and a work station 24 connected to a subscriber host database 6. Although two agent stations 21, 22 are shown in FIG. 1, there may be a lesser or greater number as required. The gateway 20 sends to the ACD 16 a second set of data which includes certain pertinent information for the particular application. This second set of data may include, for example, information from the first set of data obtained from the smart card as well as application-specific information stored in the gateway database 215. This information may be sent on a separate data line not shown in FIG. 1 or FIG. 2 connecting the gateway database 215 to the host database 26. Alternatively, in the embodiment shown in FIG. 1 and FIG. 2, the gateway 20 sends the second set of data from the gateway database 215 over data path 15 to the ACD 16 via the switched networks 11, 12. The data path 15, shown as a dotted line connecting the gateway 20 and the ACD 16 via the switched networks 11, 12, and the voice path 13 may consist of a single facility such as an integrated services digital network (ISDN), capable of supporting both data and voice. The data path 216, connecting the gateway database 215 and the switch 200 may be an Adjunct/Switch Application Interface (ASAI) or other suitable facility.

The ACD 16 then determines which of the agent stations 21, 22 will receive the call, for example agent station 21. Once the ACD 16 determines which of the agent stations 21, 22 the call will be routed to, the agent's station identification and the other pertinent information received from the gateway 20 is sent to the subscriber host database 26. The ACD 16 is connected to the subscriber host 26 by a data path 27 which may be an Adjunct/Switch Application Interface (ASAI) or other suitable facility. Also, information such as the caller identification number can be sent to the host database 26 so that preferred customers are treated in a preferred manner with the use of technologies such as or similar to Intelligent Call Processing. The host database 26 then sends the information to the specified agent's work station 24. The caller may hear ringing for an agent. The agent is then connected to the caller while the caller's application specific profile is displayed on the agent's work station 24. One advantage of this method is that the gateway 20, thereby, eliminates the need to change or modify the subscriber host 26 in order for it to be capable of handling transactions from various types of smart card reader/writers or caller devices. In effect, the gateway 20 provides a transparency in the communication between the subscriber host 26 and the smart card station 4.

Once connected, the caller and agent can complete a new transaction or modify an existing one. The agent then sends the new or updated transaction information to the host database 26 and, simultaneously, updates the caller's smart card either directly or via the gateway 20. The gateway 20 permits the transaction to be summarized to the caller by screen display or voice back without the agent's assistance. The caller also can re-establish communication with an agent if desired.

Another advantage of sending the transaction information via the gateway 20 is that the gateway 20 retains the smart card image, including information about the completed transaction, in the gateway database 215 to serve as a back-up for the card. Such a function is particularly advantageous for a card containing multiple applications. Should the card be lost, the duplicated information on the card would be available from the gateway database 215. Therefore, the card holder or the smart card distributor would not need to contact each subscriber individually in order to update the smart card with new information. Similarly, the gateway database 215 serves as a back-up for the host database 26.

When the entire transaction is completed, the VRU 210 prompts the caller to hang-up and remove the smart card from the card reader/writer 6. The gateway 20 also sends a message to the host database 26 indicating that the transaction is completed.

As an additional feature of the present invention, if the caller intends to pay for a purchase by credit card, the gateway 20 obtains the caller's relevant financial information from the smart card. This financial information may include, for example, the caller's credit card number that is stored on the smart card. The gateway 20 then transmits the credit card number to a credit bureau host 28 for credit card validation and a determination of available credit. This credit information can be sent along with the other pertinent information to the host database 26 and subscriber station 18 via the gateway 20.

Alternatively, the smart card gateway 20 can be utilized to allow a smart card user to purchase a product or services from a subscriber while preserving the confidentiality of certain personal financial information. Once the caller and subscriber agent have agreed upon a purchase price for a product or services, either party can activate the credit validation in which the gateway 20 serves as a mediator. The gateway 20 obtains and processes information from both parties while preserving their individual privacy. The gateway 20 obtains the credit card number, for example, from the caller's smart card and the amount of the purchase and subscriber identification information from the subscriber host 26. The gateway 20 then sends the request to the credit bureau host 28. Upon credit approval, the gateway 20 provides an authorization number to the subscriber, and it updates the credit files in the smart card. This method ensures that an individual can transact business without the subscriber knowing and recording the credit card number and expiration date. The subscriber receives, however, the necessary information, such as a credit authorization number, for rendering the proper charges. It also should be noted that the host 28 may be any other repository of information and is not intended to be limited to a credit bureau host.

Figure 3:
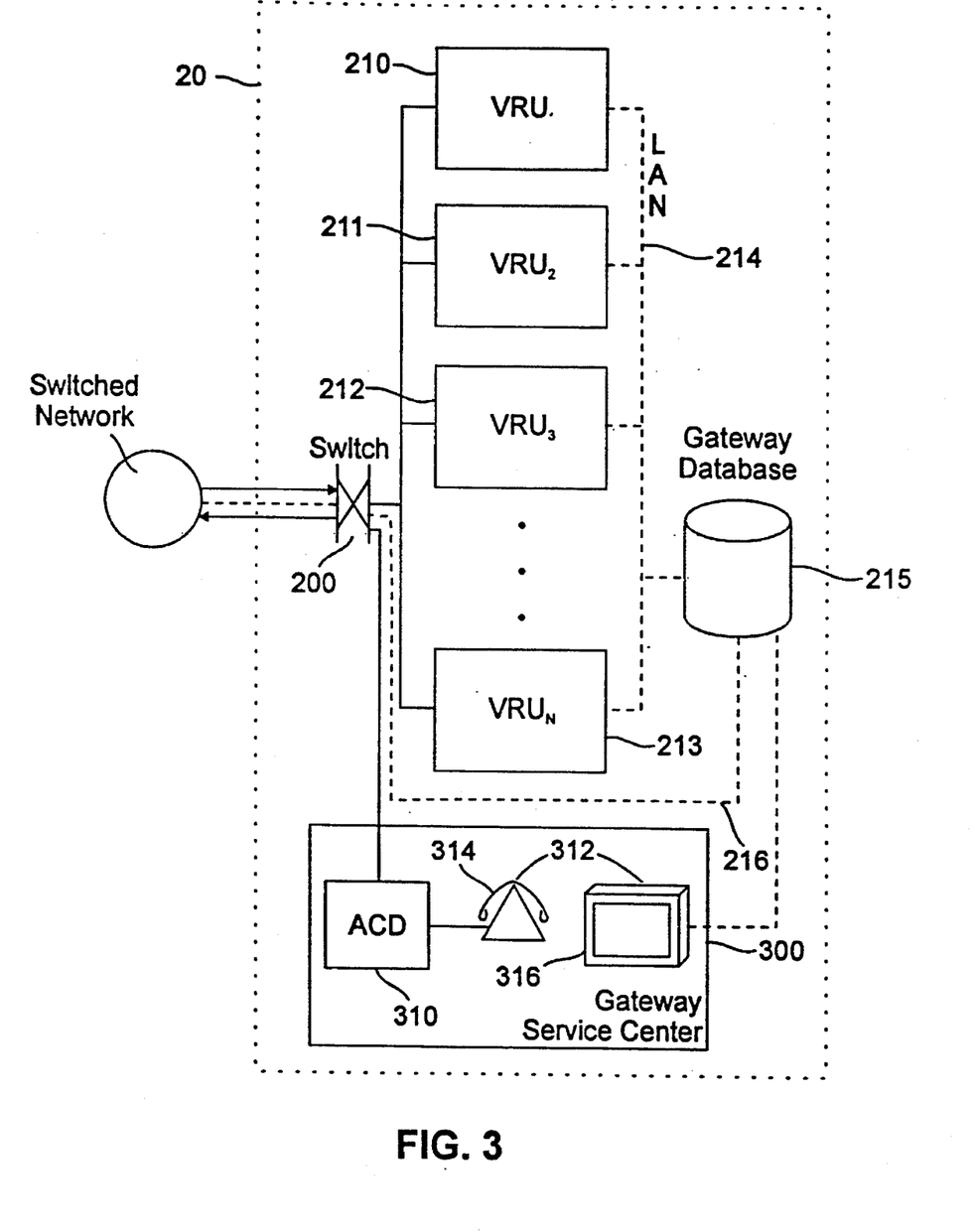
FIG. 3 is a schematic diagram showing an exemplary smart card gateway according to the present invention with additional features.

If the caller wishes to check the status of an already completed transaction, then there is no need to connect the caller to a subscriber agent. The VRU 210 gives the caller access to a smart card transaction file. Such a transaction file can be stored within a smart card user file in the gateway database 215 which contains the desired information. The desired transaction information then is transmitted to the caller station 4. Similarly, if the smart card user is located at the caller station 5, for example, the desired transaction information may be retrieved from the smart card or the database 215 and transmitted to the smart card user at the second caller station 5 in the same manner as when the caller station 4 is used. If necessary, the caller also can communicate with an agent located at a gateway service center 300 as shown in FIG. 3. The gateway service center 300 includes an ACD 310 which receives the call and routes it to an agent station 312 which may consist of a telephone 314 and a work station 316 connected to the gateway database 215. Although only one agent station 312 is shown in FIG. 3, there may be a greater number of agent stations as required. The desired information then is sent from the gateway database 215 to the agent work station 316 where an agent communicates the information to the caller.

One exemplary application of the present invention is to the airline industry. A smart card user calls an 800 number associated with a smart card distributor. After being provided with a menu of applications available on the card, the caller selects a particular application, the purchase of tickets from an airline company, for example. After inserting the smart card into the reader/writer 6, information that is pertinent to the selected subscriber, or airline company, is sent to the subscriber station 18. This information may include, for example, the caller's name, address and credit card numbers. Other application specific information, such as frequent flier number, seat preference, or special meal requirements, may be sent from a file of smart card users stored in the gateway database 215 to the subscriber station 18. A voice call is then established between the caller and an airline agent. The caller talks to the agent and purchases an airline ticket. The agent sends the flight information through the gateway 20, where a card image is maintained, and the gateway 20 sends the information to be recorded on the caller's smart card. The caller then removes the smart card from the reader/writer 6.

Upon arriving at the airport, the caller would present the card to the flight attendant. The flight attendant would then use a smart card reader/writer to verify the information and to record the boarding. Another advantage, therefore, of the present invention is that it eliminates the need for a ticket in the form of a separate document or piece of paper at the conclusion of the transaction. The traveler need not go to a travel agency or airline office in order to obtain the ticket. The smart card gateway 20, thus, automates ticket distribution and flight registration for the airlines.

Other applications of the present invention extend to the hotel industry. A caller using a smart card calls the hotel to reserve a room. A hotel reservation agent confirms the reservation and assigns a room and a door key code. This information then is transferred to and recorded on the caller's smart card. The hotel rooms would be equipped with a card reader programmed to accept the door key code written in the smart card. Upon arrival at the hotel, the card holder would insert his card into the card reader equipment associated with the hotel room door. This procedure would serve as an automatic check-in, thereby eliminating the need for a traveler to check-in and check-out at the hotel lobby.

Yet another application of the present invention extends to the car rental industry. The smart card technology and the smart card gateway 20 can be used to record the contract and car pick-up information.

An important feature of the present invention is that one distributor, a travel agency for example, can have several associated subscribers or applications such as those enumerated above. A traveler can, thereby, obtain reservations and complete transactions for all the applications by making a single telephone call. Furthermore, a single smart card can support all these applications, as well as others, including automobile or product registrations, license registrations, social security benefits registrations or magazine subscription renewal.

The smart card gateway 20 also allows a smart card user to change or update a file on the smart card containing his personal profile. Simple, direct changes, such as where a smart card user wishes to change the telephone number stored on his card, can be automated. The gateway 20 provides access to the file on the smart card containing the user's personal profile and allows him to record the updated information on the smart card. Security provisions can be provided to prevent an unauthorized user from gaining access to the smart card user's personal profile. For more complex changes, the gateway 20 routes the call to the agent station 312 at the gateway service center 300. An agent at the agent station 312 can then communicate with the caller and handle the request.

These examples are in no way intended to limit the scope of the invention. These and other alternative applications and arrangements will be readily apparent to those skilled in the art. For example, as shown in FIG. 1, the system 1 may include a second subscriber station 31 connected to a subscriber host 30 in the same manner as the subscriber station 18 and the subscriber host 26. Furthermore, the system 1 may have means 32 for establishing a data path to the subscriber host 30, such as an Adjunct/Switch Application Interface (ASAI) or other suitable facility. The present invention is, therefore, limited only by the appended claims.

We claim:

1. A system for mediating transactions involving one of a plurality of sets of data residing on a smart card, each of said sets of data corresponding to a particular one of a plurality of applications each residing on a respective one of a plurality of host computers, said system comprising:

(a) means for receiving one of said sets of data from said smart card;

(b) means for identifying a particular one of the plurality of applications in response to a selection made at a caller station by a smart card user, wherein the caller station comprises means for writing to and reading from the smart card;

(c) a smart card gateway comprising means for establishing communications between said caller station and the respective one of the host computers associated with the particular one of the plurality of applications in a manner that provides a transparency in the communications between the caller station and the respective one of the host computers; and (d) means for transferring completed transaction information from the respective one of the host computers to the caller station for recordation on said smart card.

2. The system of claim 1 further comprising a database having transaction files for storing said completed transaction information.

3. The system of claim 1 further having means for identifying a smart card distributor associated with said smart card.

4. The system of claim 3 wherein the means for identifying the smart card distributor comprises a database having a distributor file.

5. A method of employing a communication system to mediate a transaction involving one of a plurality of files and programs each of which corresponds to one of a plurality of applications where said plurality of files and programs reside on a single smart cad and where each of the plurality of applications is associated with a respective one of a plurality of subscriber host, said method comprising the steps of:

receiving in a smart card gateway a signal from a caller station;

obtaining a first set of data from the smart card;

identifying an application from among the plurality of applications in response to a selection made by a smart card user at said caller station;

establishing at least one data path from a database associated with the smart card gateway to one of the subscriber hosts associated with said application;

sending a second set of data to said one of said subscriber hosts;

transferring communications between the smart card user and said one of said subscriber hosts via the smart card gateway;

receiving, in the smart card gateway, transaction information from said subscriber hosts;

sending the transaction information from the smart card gateway to said caller station; and recording at least a portion of said transaction information on said smart card.

6. The method of claim 1 further including the step of validating said smart card user.

7. The method of claim 6 wherein said step of validating said smart card user comprises the steps of:

obtaining validation information from said smart card user;

obtaining validation data stored on said smart card;

comparing said validation information with said validation data stored on said smart card; and verifying said smart card user based upon said step of comparing.

8. The method of claim 6 wherein said step of validating said smart card user comprises the steps of:

obtaining validation information from said smart card user;

obtaining validation data stored in the database;

comparing said validation information with said validation data stored in said database; and verifying said smart card user based upon said step of comparing.

9. The method of claim 1 further including the steps of:

receiving a second signal from a second caller station;

retrieving said portion of said transaction information through said second caller station; and transmitting said portion of said transaction information to a smart card user at said second caller station.

10. The method of claim 5 further including the step of storing at least said portion of said transaction information in the database.

11. The method of claim 10 further including the steps of:

receiving a second signal from a second caller station;

retrieving said portion of said transaction information from said database; and transmitting said portion of said transaction information to a smart card user at said second caller station.

12. The method of claim 5 further comprising the step of identifying a smart card distributor associated with said smart card.

13. The method of claim 12 wherein the step of identifying the smart card distributor includes the step of retrieving information stored in the database.

14. A method of employing a communication system to mediate a transaction involving one of a plurality of files and programs each of which corresponds to one of a plurality of applications where said plurality of files and programs reside on a single smart card, said method comprising the steps of:

receiving a signal from a caller station;

obtaining a first set of data, including personal financial information, from said smart card;

identifying an application from among the plurality of applications in response to a selection made by a smart card user at the caller station;

establishing at least one data path to a subscriber host associated with said application;

sending a second set of data to said subscriber host;

transferring communications between the smart card user and the subscriber host;

establishing a data path to a credit bureau host;

sending said personal financial information to said credit bureau host;

receiving credit information from said credit bureau host;

sending said credit information to said subscriber host;

receiving transaction information from the subscriber host;

sending the transaction information to the caller station; and recording at least a portion of the transaction information on the smart card.

15. The method of claim 14 wherein the step of recording said transaction information on said smart card occurs after the step of sending said credit information to said subscriber host.

16. A method of employing a communication system to mediate a transaction involving one of a plurality of files and programs each of which corresponds to one of a plurality of applications where said plurality of files and programs reside on a single smart card, said method comprising the steps of:

receiving a signal from a caller station;

obtaining a first set of data, including personal financial information, from said smart card;

identifying an application from among the plurality of applications in response to a selection made by a smart card user at the caller station;

establishing at least one data path to a subscriber host associated with said application;

sending a second set of data to said subscriber host;

transferring communication between the smart card user and the subscriber host;

receiving financial transaction information from said subscriber host;

establishing a data path to a credit bureau host;

sending said personal financial information and said financial transaction information to said credit bureau host;

receiving credit information from said credit bureau host;

sending at least a portion of said credit information to said subscriber host such that said subscriber host does not receive any of said personal financial information;

receiving transaction information from the subscriber host;

sending the transaction information to the caller station; and recording at least a portion of the transaction information on the smart card.

17. The method of claim 16 wherein the step of recording said transaction information on said smart card occurs after the step of sending at least said portion of said credit information to said subscriber host.

18. A method of employing a communication system to mediate a transaction involving one of plurality of files and programs each of which corresponds to one of a plurality of applications where said plurality of files and applications reside on a single smart card, said method comprising the steps of:

receiving a signal from a caller station;

obtaining a first set of data from the smart card;

identifying an application from among the plurality of applications in response to a selection made by a smart card user at said caller station;

establishing at least one data path to a subscriber host associated with said application;

establishing at least one voice path to a subscriber station connected to said subscriber host;

sending a second set of data to said subscriber host;

transferring communications by voice between the smart card user and an agent at the subscriber station;

receiving transaction information from said subscriber host;

sending the transaction information to said caller station; and recording at least a portion of said transaction information on said smart card.

19. The method of claim 18 further including the step of validating said smart card user.

20. The method of claim 19 wherein said step of validating said smart card user comprises the steps of:
   obtaining validation information from said smart card user;
   obtaining validation data stored on said smart card;
   comparing said validation information with said validation data stored on said smart card; and
   verifying said smart card user based upon said step of comprising.

21. The method of claim 19 wherein said step of validating said smart card user comprises the steps of:
   obtaining validation information from said smart card user;
   obtaining validation data stored in a database associated with said communication system;
   comparing said validation information with said validation data stored in said database associated with said communication system; and
   verifying said smart card user based upon said step of comparing.

22. The method of claim 18 further including the steps of:
   obtaining personal financial information from said smart card;
   establishing a data path to a credit bureau host;
   sending said personal financial information to said credit bureau host;
   receiving credit information from said credit bureau host; and
   sending said credit information to said subscriber host.

23. The method of claim 22 wherein the step of recording said transaction information on said smart card occurs after the step of sending said credit information to said subscriber host.

24. The method of claim 18 further including the steps of:
   obtaining personal financial information from said smart card;
   receiving financial transaction information from said subscriber host;
   establishing a data path to a credit bureau host;
   sending said personal financial information and said financial transaction information to said credit bureau host;
   receiving credit information from said credit bureau host; and
   sending at least a portion of said credit information to said subscriber host such that said subscriber host does not receive any of said personal financial information.

25. The method of claim 24 wherein the step of recording said transaction information on said smart card occurs after the step of sending at least said portion of said credit information to said subscriber host.

26. The method of claim 18 further including the steps of:
   receiving a second signal from a second caller station;
   retrieving said portion of said transaction information through said second caller station; and
   transmitting said portion of said transaction information to a smart card user at said second caller station.

27. The method of claim 18 further including the step of storing at least said portion of said transaction information in a database.

28. The method of claim 27 further including the steps of:
   receiving a second signal from a second caller station;
   retrieving said portion of said transaction information from said database; and
   transmitting said portion of said transaction information to a smart card user at said second caller station.

29. The method of claim 18 further comprising the step of identifying a smart card distributor associated with said smart card.

30. The system of claim 29 wherein the step of identifying the smart card distributor includes the step of retrieving information stored in a database.

31. A system for mediating transactions involving one of a plurality of files and programs each of which corresponds to one of a plurality of applications where said plurality of files and programs reside on a single smart card, said system comprising:
   a plurality of caller stations including means for reading information from and writing information to said smart card;
   a plurality of subscriber stations;
   a plurality of subscriber hosts connected to said plurality of subscriber stations;
   means for receiving signals from said plurality of caller stations;
   means for identifying a smart card distributor associated with said smart card;
   means for obtaining data from said smart card;
   means for identifying an application selected by a smart card user from said plurality of applications;
   means for selectively establishing data paths from said plurality of caller stations to said plurality of subscriber hosts;
   means for establishing voice paths to said plurality of subscriber stations;
   means for transferring completed transaction information to one of said plurality of caller stations for recardation on said smart cars.

32. The system of claim 31 wherein the means for receiving signals from said plurality of caller stations includes a switch connected to a plurality of voice response units.

33. The system of claim 32 wherein the means for identifying the smart distributor includes a database connected to said plurality of voice response units and connected to said switch.

34. The system of claim 33 further including means for storing information about said plurality of application.

35. The system of claim 34 wherein the means for storing information about said plurality of applications includes said database.

36. The system of claim 35 further including means for storing information about completed transactions.

37. The system of claim 36 wherein the means for storing information about completed transactions includes said database.

38. The system of claim 37 further including
   a service center, said service center including a service agent station including means for receiving and sending data and means for receiving and sending voice, where said service agent station is connected to said database; and
   means for establishing voice paths to said service agent station.

39. A system for mediating a transaction involving one of a plurality of sets of data residing on a single smart card, each of said sets of data corresponding to one of a plurality of applications, said system comprising:

(a) a caller station comprising means for reading information from and recording information on said smart card;

(b) a plurality of host computers, each of which is associated with at least one of the plurality of applications; and (c) a smart card gateway comprising:
  (i) means for receiving a set of data from said smart card;
  (ii) means for identifying a particular one of the plurality of applications in response to a selection made at the caller station by a smart card user;
  (iii) means for establishing communications between said caller station and a particular one of the plurality of host computers associated with the particular one of the plurality of applications in a manner that provides a transparency in the communications between the caller station and the particular one of the plurality of host computers; and
  (iv) means for transferring completed transaction information from the particular one of the plurality of host computers to the caller station for recordation on said smart card.

40. The system of claim 39 wherein the smart card gateway further comprises a database for storing the completed transaction information.

41. The system of claim 40 wherein the database comprises a smart card transaction file.

42. The system of claim 39 further having means for identifying a smart card distributor associated with said smart card.

43. The system of claim 42 wherein the means for identifying the smart card distributor comprise a database having a distributor file.

44. A system for mediating a transaction involving one of a plurality of sets of data residing on a single smart card, each of said sets of data corresponding to one of a plurality of applications, said system comprising:

(a) a caller station comprising means for reading information from and recording information on said smart card;

(b) a plurality of host computers, each of which is associated with at least one of the plurality of applications;

(c) a smart card gateway comprising:
  (i) means for receiving a set of data from said smart card;
  (ii) means for identifying a particular one of the plurality of applications in response to a selection made at the caller station by a smart card user;
  (iii) means for establishing communications between said caller station and a particular one of the plurality of host computers associated with the particular one of the plurality of applications; and
  (iv) means for transferring completed transaction information to the caller station for recordation on said smart card;

(d) a subscriber station including an agent station, where the agent station comprises a work station connected to the particular one of the plurality of host computers; and (e) means for establishing a voice path between the smart card user at said caller station and an agent at the agent station.

45. A system for mediating a transaction involving one of a plurality of sets of data residing on a single smart card, each of said sets of data corresponding to one of a plurality of applications, said system comprising:

(a) a caller station comprising means for reading information from and recording information on said smart card;

(b) a plurality of host computers, each of which is associated with at least one of the plurality of applications;

(c) a smart card gateway comprising:
  (i) means for receiving a set of data from said smart card;
  (ii) means for identifying a particular one of the plurality of applications in response to a selection made at the caller station by a smart card user;
  (iii) means for establishing communications between said caller station and a particular one of the plurality of host computers associated with the particular one of the plurality of applications;
  (iv) means for transferring completed transaction information to the caller station for recordation on said smart card; and
  (v) a database for storing the completed transaction information;

(d) a gateway service center including an agent station, where the agent station comprises a work station connected to said database; and (e) means for establishing a voice path between the smart card user at said caller station and an agent at the agent station.

46. A system for mediating transactions involving one of a plurality of sets of data residing on a smart card, each of said sets of data corresponding to a particular one of a plurality of applications each residing on a host computer, said system comprising:

(a) means for receiving one of said sets of data from said smart card;

(b) means for identifying a particular one of the plurality of applications in response to a selection made at a caller station by a smart card user;

(c) means for establishing communications between said caller station and a host computer associated with the particular one of the plurality of applications;

(d) means for transferring completed transaction information to the caller station for recordation on said smart card;

(e) a database having transaction files for storing the completed transaction information;

(f) a gateway service center including an agent station, where the agent station comprises a work station connected to said database; and (g) means for establishing a voice path between the smart card user at said caller station and an agent at the agent station.

* * * * *